US012677118B2

(12) United States Patent
Ucar et al.

(10) Patent No.: US 12,677,118 B2
(45) Date of Patent: Jul. 7, 2026

(54) APPROACHING VEHICLE SUPPORT AND COLLABORATIVE UPLOAD BY VEHICULAR MICRO CLOUDS

(71) Applicant: TOYOTA MOTOR ENGINEERING & MANUFACTURING NORTH AMERICA, INC., Plano, TX (US)

(72) Inventors: Seyhan Ucar, Mountain View, CA (US); Chunghan Lee, Mountain View, CA (US); Onur Altintas, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/610,866

(22) Filed: Mar. 20, 2024

(65) Prior Publication Data

US 2025/0301289 A1 Sep. 25, 2025

(51) Int. Cl.
*H04W 4/44* (2018.01)
*B60Q 1/26* (2006.01)
(Continued)

(52) U.S. Cl.
CPC ............... *H04W 4/44* (2018.02); *B60Q 1/26* (2013.01); *B60W 50/14* (2013.01); *H04L 67/12* (2013.01); *H04W 4/38* (2018.02)

(58) Field of Classification Search
CPC . H04W 4/44; H04W 4/38; B60Q 1/26; B60Q 9/00; B60W 50/14; H04L 67/12; H04L 12/2854; G08G 1/00
(Continued)

(56) References Cited

U.S. PATENT DOCUMENTS 6,122,580 A 9/2000 Autermann
7,822,514 B1 * 10/2010 Erickson ................. B60R 25/04
340/426.13
(Continued)

FOREIGN PATENT DOCUMENTS

CN 116346862 A 6/2023
DE 102016218934 3/2018
WO WO-2018017793 A1 * 1/2018 .............. F21S 41/13

OTHER PUBLICATIONS

Zewe, "A Simpler Path to Better Computer Vision," MIT Computer Science & Artificial Intelligence Laboratory, Nov. 23, 2022, 4 pages (https://www.csail.mit.edu/news/simpler-path-better-computer-vision).

(Continued)

*Primary Examiner* — Tuan C To

(74) *Attorney, Agent, or Firm* — SHEPPARD, MULLIN, RICHTER & HAMPTON LLP; Daniel N. Yannuzzi

(57) ABSTRACT

Systems and methods are provided for enhancing a vehicle's approaching vehicle response system. A vehicular micro cloud (VMC) can be formed in response to a subject vehicle activating an approaching vehicle response system. The vehicle can determine one or more monitoring parameters for one or more vehicles of the VMC. The subject vehicle's approaching vehicle response system can be adjusted based on the one or more vehicles of the VMC executing the one or more monitoring parameters. The vehicle can then adjust an operating characteristic based on an approaching vehicle.

20 Claims, 10 Drawing Sheets

FORM A VEHICULAR MICRO CLOUD (VMC) IN RESPONSE TO AN ACTIVATED APPROACHING VEHICLE RESPONSE SYSTEM 602

DETERMINE ONE OR MORE MONITORING PARAMETERS FOR ONE OR MORE VEHICLES OF THE VMC 604

ADJUST THE SUBJECT VEHICLE'S APPROACHING VEHICLE RESPONSE SYSTEM BASED ON THE ONE OR MORE VEHICLES OF THE VMC EXECUTING THE ONE OR MORE MONITORING PARAMETERS 606

ADJUST AN OPERATING CHARACTERISTIC OF THE VEHICLE BASED ON THE APPROACHING VEHICLE 608

(51) Int. Cl.
    *B60W 50/14*         (2020.01)
    *H04L 67/12*         (2022.01)
    *H04W 4/38*         (2018.01)

(58) Field of Classification Search
    USPC ............................................................ 701/1
    See application file for complete search history.

(56)               References Cited

U.S. PATENT DOCUMENTS

| | | | |
|---|---|---|---|
| 8,060,400 B2 * | 11/2011 | Wellman | B66F 9/07581 |
| | | | 235/375 |
| 8,121,628 B2 | 2/2012 | Mauti, Jr. | |
| 8,406,683 B2 | 3/2013 | Oesterling | |
| 8,418,039 B2 | 4/2013 | Birmingham | |
| 8,818,618 B2 * | 8/2014 | Follmer | G08G 1/096791 |
| | | | 701/33.4 |
| 8,885,498 B2 | 11/2014 | Choi | |
| 8,890,717 B2 * | 11/2014 | McClellan | G01S 5/0027 |
| | | | 340/936 |
| 10,178,531 B2 | 1/2019 | Nguyen | |
| 10,466,717 B1 | 11/2019 | Su | |
| 10,490,068 B2 * | 11/2019 | Nascimento | G08G 1/0129 |
| 10,587,998 B2 | 3/2020 | Altintas | |
| 11,106,209 B2 | 8/2021 | Ucar | |
| 11,349,903 B2 | 5/2022 | Salles | |
| 11,395,118 B2 | 7/2022 | Higuchi | |
| 11,491,985 B2 | 11/2022 | Naserian | |
| 11,659,360 B2 | 5/2023 | Higuchi | |

| | | | |
|---|---|---|---|
| 2005/0027403 A1 | 2/2005 | Nagai | |
| 2014/0094992 A1 | 4/2014 | Lambert | |
| 2016/0119739 A1 | 4/2016 | Hampel | |
| 2017/0142187 A1 | 5/2017 | Pimentel | |
| 2018/0294665 A1 * | 10/2018 | Chandan | H02J 3/28 |
| 2019/0041853 A1 * | 2/2019 | Jain | B62D 15/0285 |
| 2019/0253853 A1 | 8/2019 | Makled | |
| 2021/0306682 A1 | 9/2021 | Ucar | |
| 2022/0036098 A1 | 2/2022 | Cheng | |
| 2022/0053308 A1 | 2/2022 | Higuchi | |
| 2022/0075365 A1 | 3/2022 | Ucar | |
| 2023/0078042 A1 * | 3/2023 | Jalali | G08G 1/162 |
| | | | 701/410 |

OTHER PUBLICATIONS

Ucar et al., "Chain of Interdependent Vehicular Micro Clouds," 2021 IEEE 93rd Vehicular Technology Conference (VTC2021-Spring), Apr. 2021, 5 pages (https://doi.org/10.1109/VTC2021-Spring51267.2021.9448911).

ETSI (European Telecommunications Standards Institute), "Intelligent Transport Systems (ITS); Vehicular Communications; Basic Set of Applications; Analysis of the Collective Perception Service (CPS); Release 2," 119 pages (https://www.etsi.org/deliver/etsi_tr/103500_103599/103562/02.01.01_60/tr_103562v020101p.pdf).

"V2X Sensor-Sharing for Cooperative and Automated Driving," SAE International, J3224_202208, Aug. 17, 2022, 66 pages (https://doi.org/10.4271/J3224_202208).

\* cited by examiner

502B

500

502A

502D

502C

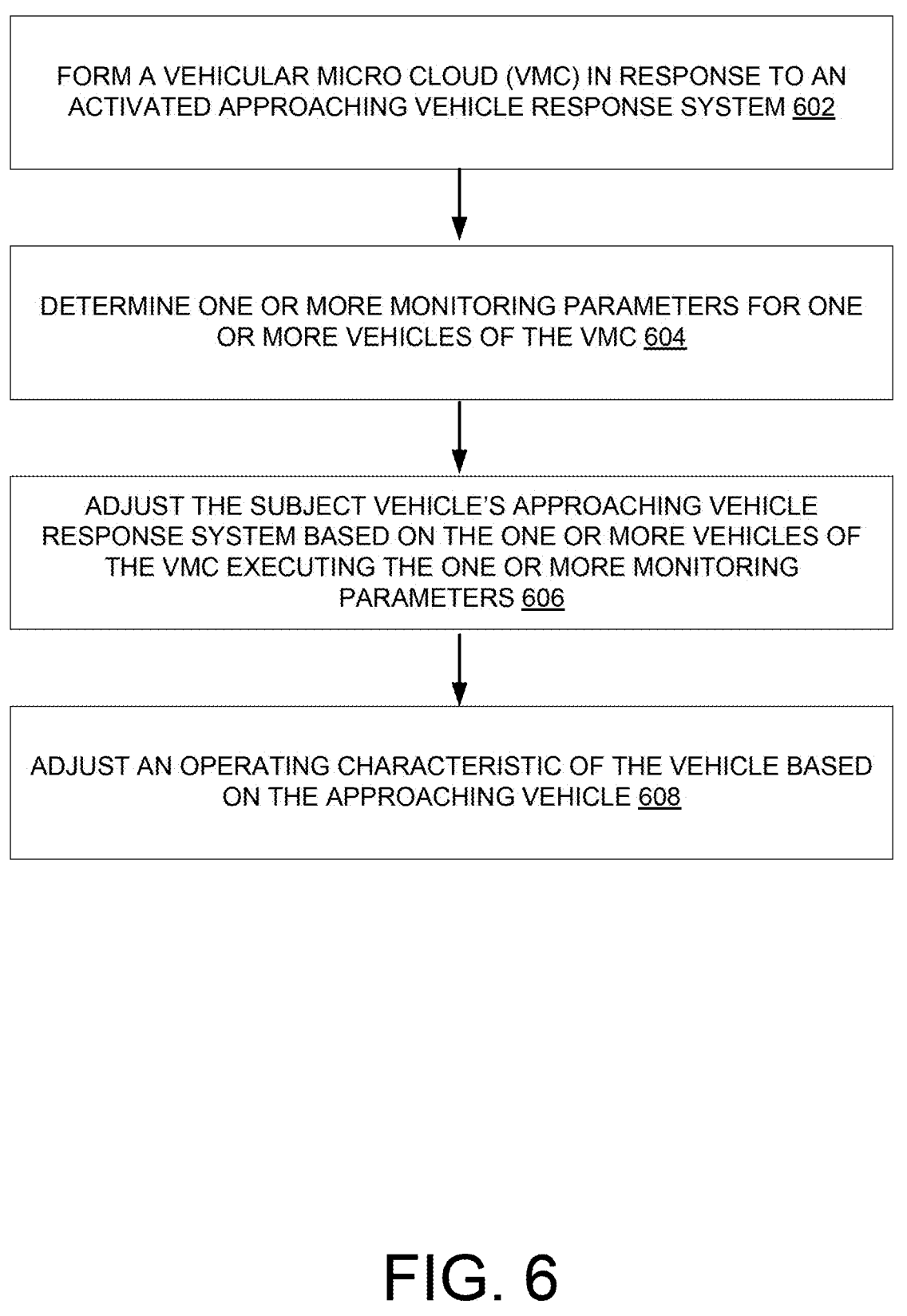

FORM A VEHICULAR MICRO CLOUD (VMC) IN RESPONSE TO AN ACTIVATED APPROACHING VEHICLE RESPONSE SYSTEM 602

DETERMINE ONE OR MORE MONITORING PARAMETERS FOR ONE OR MORE VEHICLES OF THE VMC 604

ADJUST THE SUBJECT VEHICLE'S APPROACHING VEHICLE RESPONSE SYSTEM BASED ON THE ONE OR MORE VEHICLES OF THE VMC EXECUTING THE ONE OR MORE MONITORING PARAMETERS 606

ADJUST AN OPERATING CHARACTERISTIC OF THE VEHICLE BASED ON THE APPROACHING VEHICLE 608

FIG. 6

FORM A VEHICULAR MICRO CLOUD (VMC) IN RESPONSE TO AVAILABLE DATA TO UPLOAD 702

ANALYZE ONE OR MORE UPLOADING CHARACTERISTICS OF ONE OR MORE VEHICLES IN THE VMC 704

SELECT A SUBSET OF THE ONE OR MORE VEHICLES IN THE VMC TO UPLOAD THE AVAILABLE DATA BASED ON THE ONE OR MORE UPLOADING CHARACTERISTICS 706

COLLABORATIVELY UPLOAD THE AVAILABLE DATA USING THE SUBSET 708

APPROACHING VEHICLE SUPPORT AND COLLABORATIVE UPLOAD BY VEHICULAR MICRO CLOUDS

CROSS-REFERENCE TO RELATED APPLICATIONS

This application is related to co-pending and co-owned U.S. application Ser. No. 18/610,969, filed on even date herewith, titled "APPROACHING VEHICLE SUPPORT AND COLLABORATIVE UPLOAD BY VEHICULAR MICRO CLOUDS," which is incorporated herein by reference in its entirety.

TECHNICAL FIELD

The present disclosure relates generally to vehicular micro clouds, and in particular, some implementations may relate to the formation of vehicular micro clouds for use in sensor view support and/or data upload support.

DESCRIPTION OF RELATED ART

Vehicle systems can monitor approaching vehicles in various contexts. For example, to perform an automated lane change, a vehicle can observe the movement of other nearby cars to predict a probability of a successful lane change. Based on this prediction, an autonomous vehicle can perform a lane change automatically. Vehicles may also have functions to monitor and notify drivers of approaching rear vehicles, such as a Rear Vehicle Approaching Indication (RVAI) or Approaching Vehicle Support (AVS). RVAI functions can monitor rear vehicles and alert drivers when rear vehicles are approaching. Similarly, an AVS system can monitor rear vehicles and alert the driver when the rear vehicle is an aggressive driver. While RVAI functions or AVS systems are active, a vehicle can record video footage and other sensor data, which can be uploaded or transmitted to a network, to authorities, to nearby vehicles, etc.

BRIEF SUMMARY OF THE DISCLOSURE

According to various embodiments of the disclosed technology, a method can comprise forming a vehicular micro cloud (VMC) in response to a subject vehicle activating an approaching vehicle response system; determining one or more monitoring parameters for one or more vehicles of the VMC; adjusting the subject vehicle's approaching vehicle response system based on the one or more vehicles of the VMC executing the one or more monitoring parameters; and adjusting an operating characteristic of the subject vehicle based on an approaching vehicle.

In some embodiments, the one or more monitoring parameters are configured to detect an unsafe driving condition associated with the approaching vehicle.

In some embodiments, the subject vehicle determines the one or more monitoring parameters for the one or more vehicles of the VMC.

In some embodiments, the method further comprises generating an alert for the approaching vehicle response system based on detecting the approaching vehicle.

In some embodiments, the method further comprises generating a notification for a driver of the subject vehicle based on detecting the approaching vehicle.

In some embodiments, the one or more vehicles of the VMC track surrounding vehicles using sensor data to detect the approaching vehicle.

In some embodiments, the method further comprises transmitting the sensor data from the one or more vehicles of the VMC to the subject vehicle.

In some embodiments, the method further comprises collaboratively uploading the sensor data with the one or more vehicles of the VMC.

According to various embodiments of the disclosed technology, a vehicle can comprise a processor and a memory coupled to the processor to store instructions. These instructions, when executed by the processor, can cause the processor to form a vehicular micro cloud (VMC) in response to an activated approaching vehicle response system; determine one or more monitoring parameters for one or more vehicles of the VMC; receive sensor data from the one or more vehicles of the VMC based on the one or more monitoring parameters; adjust the vehicle's approaching vehicle response system based on the received sensor data and the one or more monitoring parameters; and adjust an operating characteristic of the vehicle based on an approaching vehicle.

In some embodiments, the one or more monitoring parameters are configured to detect an unsafe driving condition associated with the approaching vehicle.

In some embodiments, the instructions further cause the processor to generate an alert for the activated approaching vehicle response system based on detecting the approaching vehicle.

In some embodiments, the instructions further cause the processor to generate a notification for a driver of the vehicle based on detecting the approaching vehicle.

In some embodiments, the instructions further cause the processor to collaboratively upload the sensor data with the one or more vehicles of the VMC.

In some embodiments, collaboratively uploading the sensor data comprises selecting a subset of the one or more vehicles of the VMC to upload the sensor data.

According to various embodiments of the disclosed technology, a non-transitory machine-readable medium can have instructions stored therein. The instructions, when executed by a processor, can cause the processor to form a vehicular micro cloud (VMC) in response to a subject vehicle activating an approaching vehicle response system; determine one or more monitoring parameters for one or more vehicles of the VMC; adjust the subject vehicle's approaching vehicle response system based on the one or more vehicles of the VMC executing the one or more monitoring parameters; adjust an operating characteristic of the subject vehicle based on an approaching vehicle; and collaboratively upload sensor data related to the approaching vehicle with the one or more vehicles of the VMC.

In some embodiments, the one or more monitoring parameters are configured to detect an unsafe driving condition associated with the approaching vehicle.

In some embodiments, the instructions further cause the processor to generate an alert for the approaching vehicle response system based on detecting the approaching vehicle.

In some embodiments, the instructions further cause the processor to generate a notification for a driver of the subject vehicle based on detecting the approaching vehicle.

In some embodiments, the one or more vehicles of the VMC track surrounding vehicles using sensor data to detect the approaching vehicle.

In some embodiments, the instructions further cause the processor to transmit the sensor data related to the approaching vehicle from the one or more vehicles of the VMC to the subject vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 illustrates an example method for approaching vehicle supporting using vehicular micro clouds in accordance with one embodiment.

Figure 1:
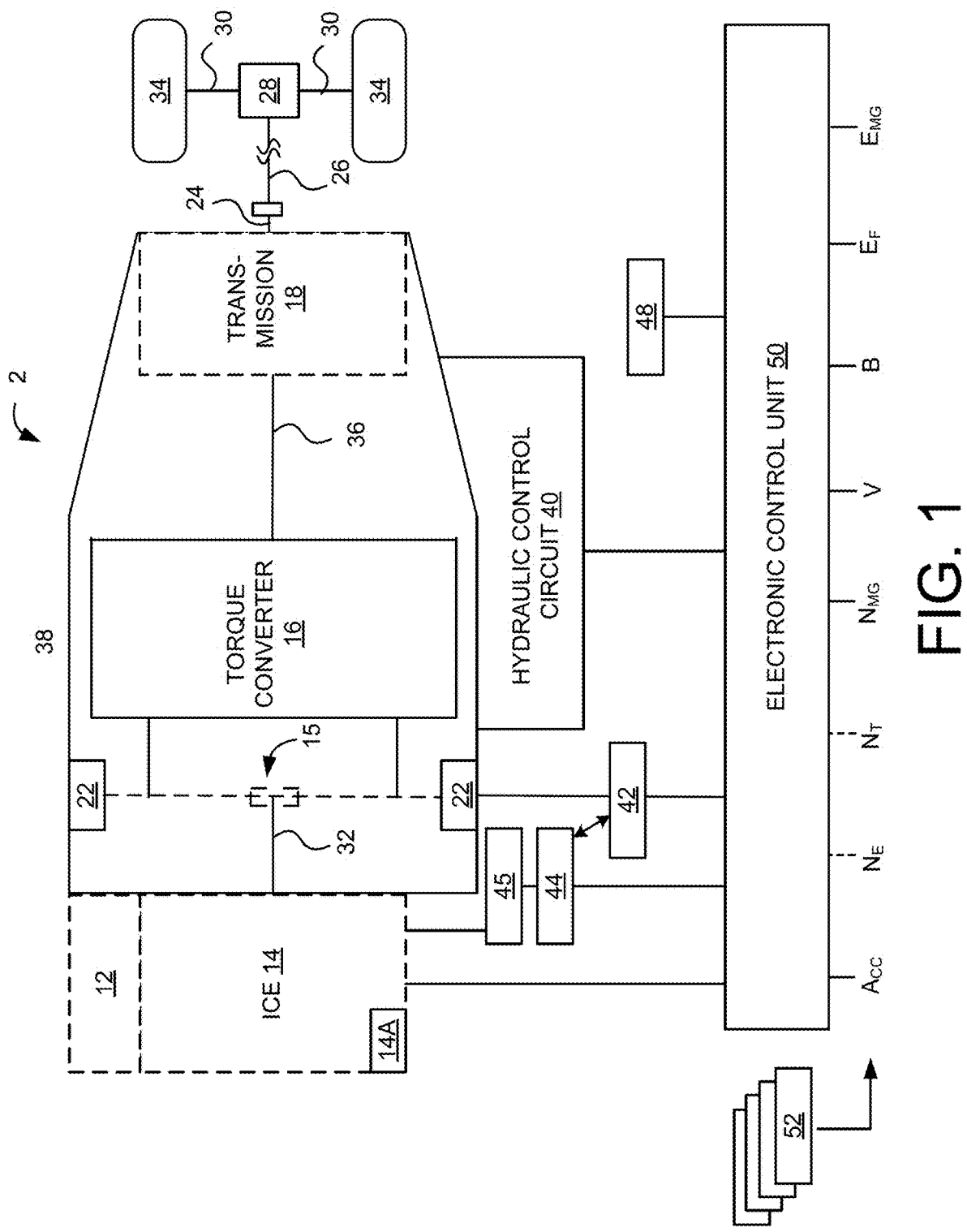
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Rear vehicle systems such as RVAI and AVS systems in ego vehicles can monitor rear vehicles and alert drivers when rear vehicles are approaching. As used herein, a "rear vehicle" or an "approaching vehicle" can refer to a vehicle that is located or positioned behind the rear of the ego vehicle, and gradually draws closer to the rear of the ego vehicle. For purposes of the present application, "rear vehicle" and "approaching vehicle" may be used interchangeably. However, traditional systems are limited to only the sensor measurement of an ego vehicle. In some driving scenarios, this single point of observation may not be enough to make proper conclusions about/characterize approaching vehicles. In these situations, rear vehicle systems may misguide the driver of the ego vehicle due to basing conclusions about/characterizing approaching vehicles on the ego vehicle's limited perspective. In other traditional systems, the ego vehicle's sensors may be blocked by other objects such as a dolly, bike rack or trailer attached to a vehicle. Some systems have attempted to leverage connected vehicles to improve the sensor view of the ego vehicle. However, these systems are limited by vehicles with immediate proximity to the ego vehicle, meaning that these systems cannot take advantage of vehicles further away from the ego vehicle. Additionally, these systems require a trigger to leverage connected vehicles such as an anomaly detection, initiation of remote support, etc. This can be problematic if the trigger does not occur. For example, a vehicle may not detect an anomaly because its sensor view is occluded. Because that detection did not occur, the connected vehicles will not augment the ego vehicle's sensor view.

Additionally, in some situations, an ego vehicle needs to upload its sensor data, video data, environmental data, or any other data collected and stored. Traditional vehicle systems can use cellular communication to upload data. However, in some cases, this is not available. For instance, if the amount of data is very large, cellular communication may not be available. In these cases, data upload cannot occur until the ego vehicle is connected to WiFi®. Waiting for a single vehicle to 1) receive WiFi® connection and 2) upload large amounts of data by itself can lead to significant delays.

Embodiments of the systems and methods disclosed herein avoid the aforementioned issues using vehicular micro clouds (VMCs). VMCs can refer to groups of vehicles that are not limited in size, proximity, and location. Various types of VMCs can be employed depending on the situation. Stationary VMCs may comprise a series of stationary vehicles observing a scene or event (i.e., an accident, hazard, etc.). Mobile VMCs may surround and follow a micro cloud leader (e.g., the ego vehicle) as the micro cloud leader traverses. Mobile VMCs may link together to form chains of interdependent VMCs. In some embodiments, a vehicle may be a part of more than one VMC. Remote VMCs may be designated at a remote server and generated based on a specific remote location. Vehicles within this remote location may form the remote VMC.

VMCs can be used to augment an ego vehicle's systems to determine an approaching vehicle. Determinations about approaching vehicles may change depending on the needs of the ego vehicle or members of the VMC. The VMC may shift perspective and may augment sensor data associated with different monitoring parameters depending on the situation. A VMC can also collaboratively upload sensor data. In some embodiments, the VMC may need to be formed to accommodate the data being uploaded. Certain types of VMCs may be advantageous for certain data upload situations. The system can analyze the VMC's characteristics to determine which vehicles of the VMC can facilitate the upload. A subset of the VMC can then facilitate a collaborative upload. A remote data center can receive uploaded data and monitor the performance of vehicle data collection and refine the system.

The systems and methods disclosed herein may apply to any rear vehicle based applications or systems. The use of "RVAI" and "AVS" systems described throughout are examples of such systems, but do not limit the embodiments described herein to only RVAI and AVS systems. The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods incorporating VMCs can be implemented in other types of vehicles including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium-ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/ disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
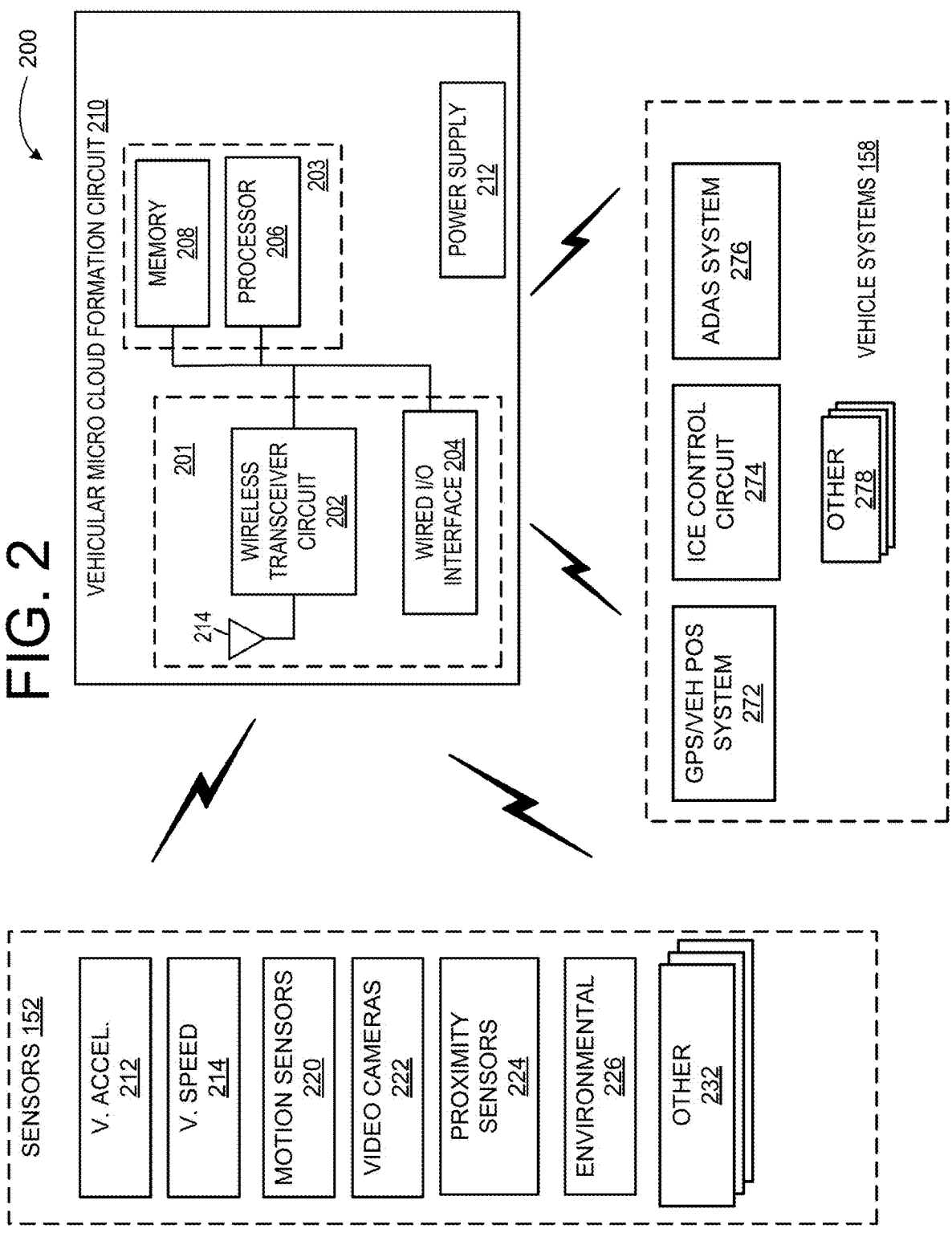
FIG. 2 illustrates an example architecture for vehicular micro cloud formation in accordance with one embodiment of the systems and methods described herein.

FIG. 2 illustrates an example architecture for VMC formation in accordance with one embodiment of the systems and methods described herein. In some embodiments, VMC formation system 200 can be implemented in-vehicle to execute while a driver is operating the vehicle. In other embodiments, VMC formation system 200 can operate over a cloud or other network. Referring now to FIG. 2, in this example, VMC formation system 200 includes a VMC formation circuit 210, a plurality of sensors 152 and a plurality of vehicle systems 158.

Sensors 152 and vehicle systems 158 can communicate with VMC formation circuit 210 via a wired or wireless communication interface. Although sensors 152 and vehicle systems 158 are depicted as communicating with VMC formation circuit 210, they can also communicate with each other as well as with other vehicle systems. In embodiments where VMC formation circuit 210 is implemented in-vehicle, VMC formation circuit 210 can be implemented as an ECU or as part of an ECU such as, for example electronic control unit 50. In other embodiments, VMC formation circuit 210 can be implemented independently of the ECU, such that sensors 152 and vehicle systems 158 can communicate to VMC formation circuit 210 over a network, server or cloud interface. In embodiments where VMC formation circuit 210 operates over a network, VMC formation circuit 210 can execute the architecture described below in FIGS. 3-5B and communicate back to sensors 152 and vehicle systems 158.

VMC formation circuit 210 in this example includes a communication circuit 201, a decision circuit 203 (including a processor 206 and memory 208 in this example) and a power supply 212. Components of VMC formation circuit 210 are illustrated as communicating with each other via a data bus, although other communication in interfaces can be included.

Decision circuit 203 can receive sensor data from sensors 152 and communicate with vehicle systems 158. If the vehicle activates an approaching vehicle response system, decision circuit 203 can generate a VMC. This VMC designation can be communicated to other VMC members using communication circuit 201. As described further below in FIG. 3, decision circuit 203 can determine monitoring parameters based on sensor data received from sensors 152 or sensor data from VMC members at communication circuit 201. Based on the monitoring parameters and sensor data, decision circuit 203 can detect an approaching vehicle. Decision circuit 203 can then communicate with vehicle systems 158 to adjust an operating characteristic of the vehicle based on the approaching vehicle. Vehicle RVAI and AVS systems may generate notifications for the driver of the vehicle, may alter an operating characteristic for a vehicle (e.g., in autonomous systems), or may transmit data about the approaching vehicle via communication circuit 201 to a third party such as a remote server, authorities, or nearby vehicles.

VMC formation circuit 210 can also be configured to facilitate collaborative upload of data using VMCs. As described above, decision circuit 203 can form a VMC in response to a determination that vehicle sensor data is available to upload. Decision circuit 203 can receive information and statuses of VMC members at communication circuit 201. Based on this information, decision circuit 203 can analyze uploading characteristics of one or more vehicles in the VMC. The characteristics can be inferred based on a feedback loop to continuously improve selections of VMC candidates. Decision circuit 203 can select a subset of the one or more micro cloud members in the VMC to collaboratively upload the sensor data from sensors 152 based on the one or more uploading characteristics. VMC formation circuit 210 can transmit the vehicle's sensor data to VMC members using communication circuit 201. The vehicle and other VMC members can upload the sensor data to a remote data center. A remote data center can receive uploaded data and monitor the performance of vehicle data collection and refine the system. A remote network can recommend improvements for the election of VMC members, pre-processing steps, etc. The remote network can transmit these recommendations to VMC formation circuit 210 to refine future efforts to collaboratively upload sensor data.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to VMC formation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a VMC formation circuit 210.

Communication circuit 201 either or both a wireless transceiver circuit 202 with an associated antenna 205 and a wired I/O interface 204 with an associated hardwired data port (not illustrated). Communication circuit 201 can provide for V2X and/or V2V communications capabilities, allowing VMC formation circuit 210 to communicate with edge devices, such as roadside unit/equipment (RSU/RSE), network cloud servers and cloud-based databases, and/or other vehicles via a network. For example, V2X communication capabilities allows VMC formation circuit 210 to communicate with edge/cloud devices, roadside infrastructure (e.g., such as roadside equipment/roadside unit, which may be a vehicle-to-infrastructure (V2I)-enabled streetlight or cameras, for example), etc. Local VMC formation circuit 210 may also communicate with other connected vehicles over vehicle-to-vehicle (V2V) communications.

As used herein, "connected vehicle" refers to a vehicle that is actively connected to edge devices, other vehicles, and/or a cloud server via a network through V2X, V2I, and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As this example illustrates, communications with VMC formation circuit 210 can include either or both wired and wireless communications circuits 201. Wireless transceiver circuit 202 can include a transmitter and a receiver (not shown) to allow wireless communications via any of a number of communication protocols such as, for example, WiFi®, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by VMC formation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which VMC formation system 200 is implemented. In the illustrated example, sensors 152 include vehicle acceleration sensors 212, vehicle speed sensors 214, motion sensors 220 (providing up to a 360 degree view surrounding the vehicle), video cameras (e.g., to record activity behind, to the side, or in front of the vehicle), proximity sensors 224 (to detect distances between the vehicle and surrounding or approaching vehicles), and environmental sensors 226 (e.g., to detect salinity or other environmental conditions). Additional sensors 232 can also be included as may be appropriate for a given implementation of VMC formation system 200.

Vehicle systems 158 can include any of a number of different vehicle components or subsystems used to control or monitor various aspects of the vehicle and its performance. In this example, the vehicle systems 158 include a GPS or other vehicle positioning system 272; engine control circuits 274 to control the operation of engine (e.g. Internal combustion engine 14); Advanced Driver Assistance (ADAS) system 276 (to engage autonomous driving) and other vehicle systems 280. VMC formation circuit 210 can communicate with ADAS system 276 to engage in autonomous driving assistance or control vis-a-vis controlling or instructing engine operation. That is, ADAS may control or send instructions to engine control components to move the vehicle to one or more locations for purposes of forming the VMC.

Communication circuit 201 can be used to transmit and receive information between VMC formation circuit 210 and sensors 152, and VMC formation circuit 210 and vehicle systems 158. Also, sensors 152 may communicate with vehicle systems 158 directly or indirectly (e.g., via communication circuit 201 or otherwise).

Figure 3:
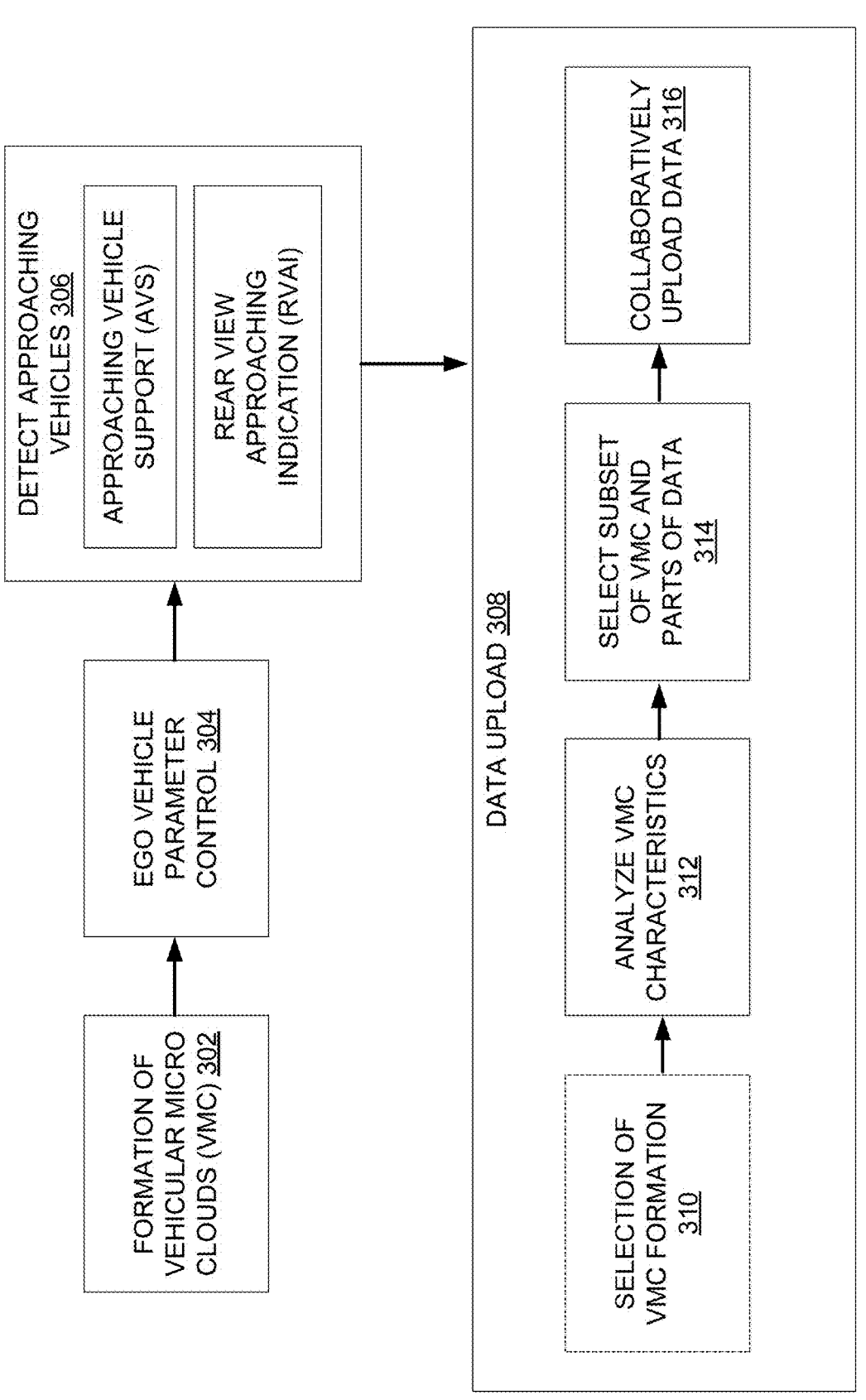
FIG. 3 illustrates an example system for approaching vehicle support and collaborative upload using vehicular micro clouds in accordance with various embodiments.

FIG. 3 illustrates an example system for approaching vehicle support and collaborative upload using VMCs. At block 302, the system can form a VMC. An ego vehicle can transmit a request and initiate the formation of the VMC. VMCs can be formed to observe subject vehicles from different perspectives. The ego vehicle can lead the collaboration and guide the vehicles on which parameters to monitor, when to alert rear-vehicle related applications in the ego vehicle (e.g., RVAI or AVS systems), and when to notify the ego vehicle driver. Various types of VMCs can be employed depending on the situation. Any VMC can be used to support the ego vehicle.

It should be noted that embodiments of the disclosed technology contemplate various ways in which a VMC may be generated. In some embodiments, the ego vehicle may be deemed to be or elected to be a micro cloud leader. In such embodiments, the micro cloud leader may use an internal VMC formation circuit (e.g. VMC formation circuit 210) to communicate with vehicles to be added to the VMC. In other embodiments, the ego vehicle may communicate with a remote server to generate the VMC and communicate the designation to other vehicles. As the micro cloud leader, the ego vehicle can also obtain/provide substantially constant/up-to-date sensor data from the vehicle's sensors (e.g. sensors 152), avoiding a need to communicate with potentially different RSE or connected vehicles that may be relevant in one period during the travel of the ego vehicle, and not relevant in a subsequent period, and so on. Other types of VMCs contemplated by various embodiments includes chained, interdependent micro clouds that can work together to monitor approaching vehicles. For example, a first micro cloud may reorganize and provide sensor data to a second/next vehicular micro cloud, and so on, the result being a chain of micro clouds that "follows" the travel of the VMCs. Certain connected vehicles may be traveling such that they enter another/next micro cloud and should be taken into consideration when monitoring approaching vehicles. In some embodiments, vehicles traveling between VMCs may become approaching vehicles. In still other embodiments, micro clouds may be generated "remotely" meaning well in advance of or behind an ego vehicle, e.g., where the ego vehicle is not within the geographical area according to which the micro cloud is generated. For example, a determination may be made, e.g., by a remote server or VMC formation circuit 210 that an approaching vehicle at a distance behind the ego vehicle needs to be monitored. Vehicles entering the vicinity of the approaching vehicle may be added to a VMC even if the ego vehicle is far ahead. This remote VMC can transmit sensor data to the ego vehicle until the approaching vehicle is within sensor range of the ego vehicle.

At block 304, the VMC can monitor certain parameters to determine an approaching vehicle. For rear-vehicle related applications (e.g., RVAI or AVS applications), the ego vehicle can analyze the application requirements to obtain these parameters. These parameters can be configured to detect an unsafe driving condition associated with the approaching vehicle. For example, the VMC may monitor parameters including weaving, excessive speeds and lane changes, tailgating, or any other conditions to determine an approaching vehicle. In an example including a RVAI application, the VMC can observe the approaching rear vehicle from multiple perspectives for one or more parameters. The VMC may monitor these parameters via sensor data of the ego vehicle and/or VMC members. For example, motion sensors between multiple VMC members can track the trajectory of an approaching vehicle. This trajectory can be sent to the ego vehicle. Using VMC formation circuit 210, the ego vehicle can receive this trajectory and compare the trajectory to weaving patterns. VMC formation circuit 210 can then determine that this trajectory is similar to a weaving pattern. VMC formation circuit 210 (or in some embodiments, a remote server) can evaluate sensor data and compare the results to known patterns corresponding to the parameters. The system can continuously update its findings and comparisons as situations change or reoccur. In some embodiments, VMC formation circuit 210 can tailor parameters to the situation based on sensor data. For instance, sensor data from the VMC can indicate that there's heavy traffic. In heavy traffic, a weaving vehicle may act more erratically/irregular as opposed to traveling in a cyclical weaving pattern. The ego vehicle can determine weaving patterns in consideration of the environment, based on continuous updates from the VMC. In some embodiments, the ego vehicle can determine monitoring parameters. In other embodiments, multiple members of the VMC can determine one or more monitoring parameters. In accordance with the monitoring parameters, the VMC can track surrounding or nearby vehicles using sensor data to detect the approaching vehicle.

At block 306, the VMC can determine an approaching vehicle based on monitoring the above parameters. In some embodiments, the sensor data collected throughout the VMC can be transmitted to the ego vehicle, so that the ego vehicle can make determinations about the approaching vehicle. In such embodiments, VMC formation circuit 210 (or a remote server) can determine an approaching vehicle in accordance with the parameters. Certain levels of parameters or similarities in the parameters can be used to determine the approaching vehicle. If one or more monitoring parameters satisfies a particular threshold or level associated with a likelihood of an approaching vehicle, VMC formation circuit or a remote server can determine that there's an approaching vehicle. For example, if the detected trajectory matches known or previous weaving patterns, the trajectory can be associated with weaving patterns and the VMC or ego vehicle can determine an approaching vehicle with weaving patterns. As another example, if the approaching vehicle is tailgating other vehicles or VMC members within a certain close distance between vehicles, an approaching tailgating vehicle can be determined. As described above, the VMC can collaboratively share the sensor data. Members of the VMC can make a group determination about the approaching vehicle. Group determinations can be accomplished, for example, by each member evaluating its sensor data and/or sensor data in the VMC to individually determine an approaching vehicle. If multiple or all vehicles in the VMC make a similar determination, the VMC can overall determine the approaching vehicle. In some embodiments, the augmented sensor view of the VMC can enhance the ego vehicle's rear vehicle systems. In such embodiments, the ego vehicle can solely determine the approaching vehicle and implement rear vehicle systems such as RVAI and/or AVS systems. The RVAI and AVS systems of an ego vehicle may generate notifications for the driver of the vehicle, alter an operating characteristic for a vehicle (e.g., in autonomous systems), or may transmit data about the approaching vehicle to a third party such as a remote server, authorities, or nearby vehicles.

Determinations about approaching vehicles may change depending on the needs of the ego vehicle or members of the VMC. The VMC may shift perspective and may augment sensor data associated with different monitoring parameters depending on the situation. For example, a VMC may monitor a weaving vehicle at first. Members of the VMC may detect a different vehicle that is tailgating the ego vehicle and is outside the sensor view of the ego vehicle but within the sensor view of the VMC. The VMC may shift monitoring parameters to follow the tailgating vehicle. Updated guidance and notifications can be sent or displayed in the ego vehicle in accordance with the determinations of the VMC.

At block 308, the VMC can collaboratively upload sensor data. It should be noted that the system in block 308 can operate in situations outside of detecting approaching vehicles. In the case of FIG. 3, a VMC is already formed to support an ego vehicle in monitoring rear vehicles. In other embodiments, the system can generate a VMC specifically for data upload at block 310. As described above, VMCs can be generated in various ways to accommodate data upload. When an ego vehicle has vehicle data to upload, it can search for other nearby connected vehicles and initiate a VMC. In some embodiments, the ego vehicle can be guided to locations in accordance with the formation of a VMC. To locate other vehicles, the ego vehicle can either communicate with other vehicles using V2X capabilities, or the ego vehicle can communicate with a remote server that can provide the location of suitable vehicles. The ego vehicle may be guided to locations with a high change in VMC formation. In such embodiments, vehicles may communicate their VMC status with the ego vehicle, or a remote server can provide information to the ego vehicle on VMC formation rates in a certain area. In some embodiments, the VMC may need to be formed to accommodate the data being uploaded. For example, vehicle data may require large data stores or underutilized computing units to pre-process the data prior to upload. The ego-vehicle can specify such requirements and the system can guide the ego vehicle to a VMC accordingly. Certain types of VMCs may be advantageous for certain data upload situations. Stationary VMCs may be beneficial when vehicles are in range for a predefined amount of time (i.e., at an intersection). Mobile VMCS may be beneficial when vehicles are moving as a convoy. Chain VMCs may be beneficial when vehicles need pre-processing or preparation before transmitting vehicle data. Remote VMCs may be beneficial when vehicle data needs remote cooperation in a remote location.

At block 312, the system can analyze the VMC's characteristics to determine which vehicles of the VMC can facilitate the upload. The characteristics can be inferred based on a feedback loop to continuously improve selections of VMC candidates. These characteristics can inform the system of strong candidates with access, upload, or other data requirements. For example, vehicles may become connected to WiFi® when charging electric batteries. Users of electric vehicles can park their vehicles at charging stations, which may be connected to varying levels of WiFi® service. As described further below, VMC members can be tasked with uploading data while connected to WiFi®, even if the vehicle is out of the range of the VMC or is no longer moving. The time or interval that the vehicle is connected to WiFi® could be a relevant parameter in selecting VMC members. If a vehicle has a longer waiting time to charge, that waiting time could also be associated with longer and more available access to WiFi® based on the location of the parked vehicle. Other parameters include but are not limited to processing power, storage, trajectory, and WiFi® connection on planned trajectory, etc.

At block 314, the VMC can select a subset of vehicles in the VMC based on the parameters. The VMC can compare its members based on the parameters. Threshold levels of parameters or ranks in parameters can be used to determine which vehicles to select. For instance, using WiFi® connection as a parameter, a threshold interval of time for the vehicle to be connected to WiFi® can indicate that the vehicle is suitable for the subset. Alternatively, the top five or other number of VMC members with the longest WiFi® connections can be selected as the subset. A subset can include some or all vehicles of the VMC. For example, if the system applies threshold levels to parameters, it is possible that all vehicles of the VMC meet the thresholds. On the other hand, if a top number of vehicles is selected, then the subset can be limited to a portion of the VMC.

At block 316, the subset can facilitate a collaborative upload. The ego vehicle can transfer vehicle data to the micro cloud members by applying pre-defined pre-processing steps (e.g., noise filtering). Alternatively, the ego vehicle can guide micro cloud members to apply defined pre-processing steps before uploading to the vehicle data. In some embodiments, when vehicles of the VMC are connected to WiFi®, they can upload their portion of the vehicle data. In some embodiments, this upload may occur after the VMC has been dismissed. While the VMC is operational, the VMC can determine the subset of vehicles, but members of the subset may upload data at various times depending on the associating parameters. A remote data center can receive uploaded data and monitor the performance of vehicle data collection and refine the system. The data center can recommend improvements for the election of VMC members, pre-processing steps, etc. The remote network can transmit these recommendations to the ego vehicle and/or members of the VMC, so that when any member of the VMC initiates the system of block 308, the future generated VMC can be further refined.

Figure 4A:
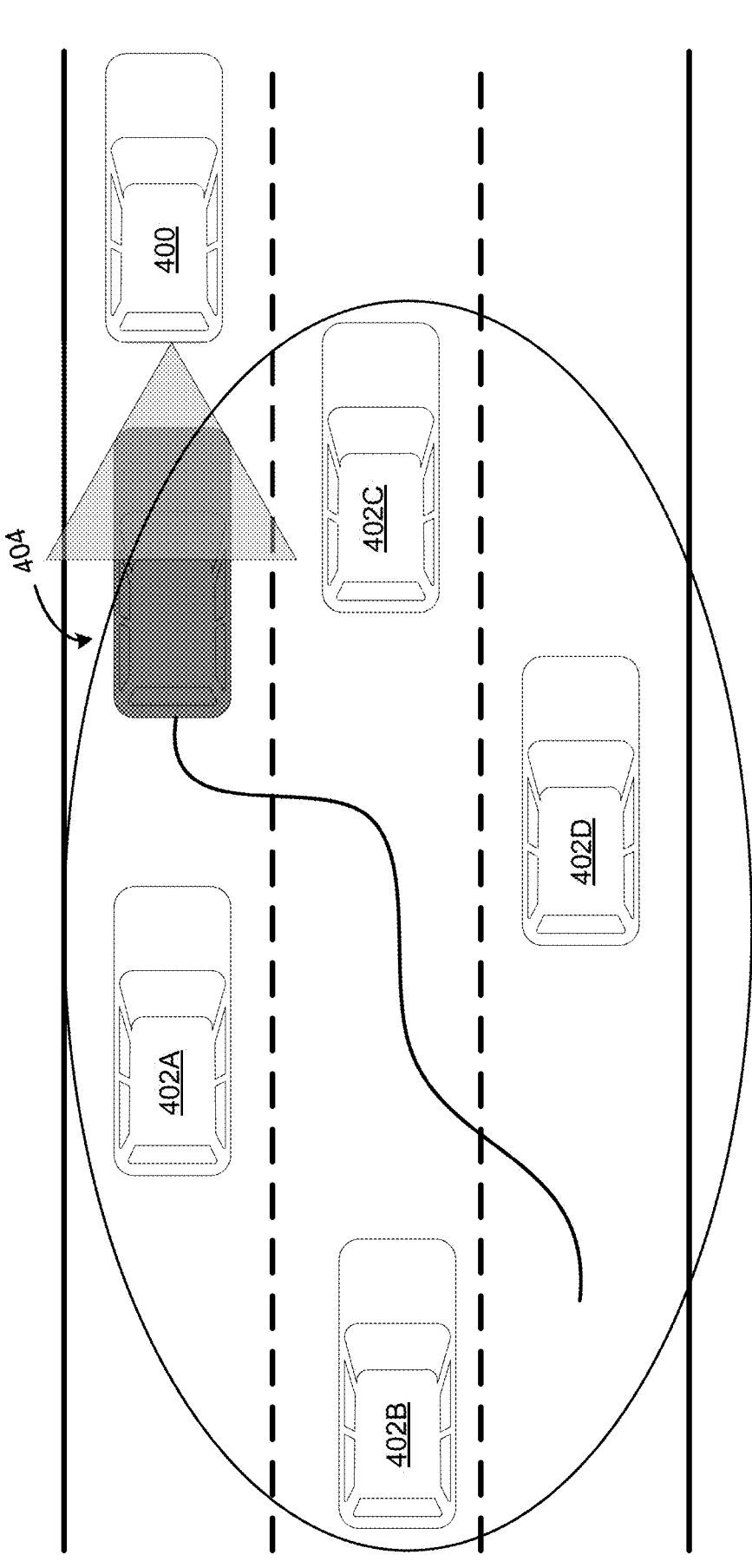
FIG. 4A illustrates an example environment incorporating approaching vehicle support in accordance with one embodiment.
Figure 4B:
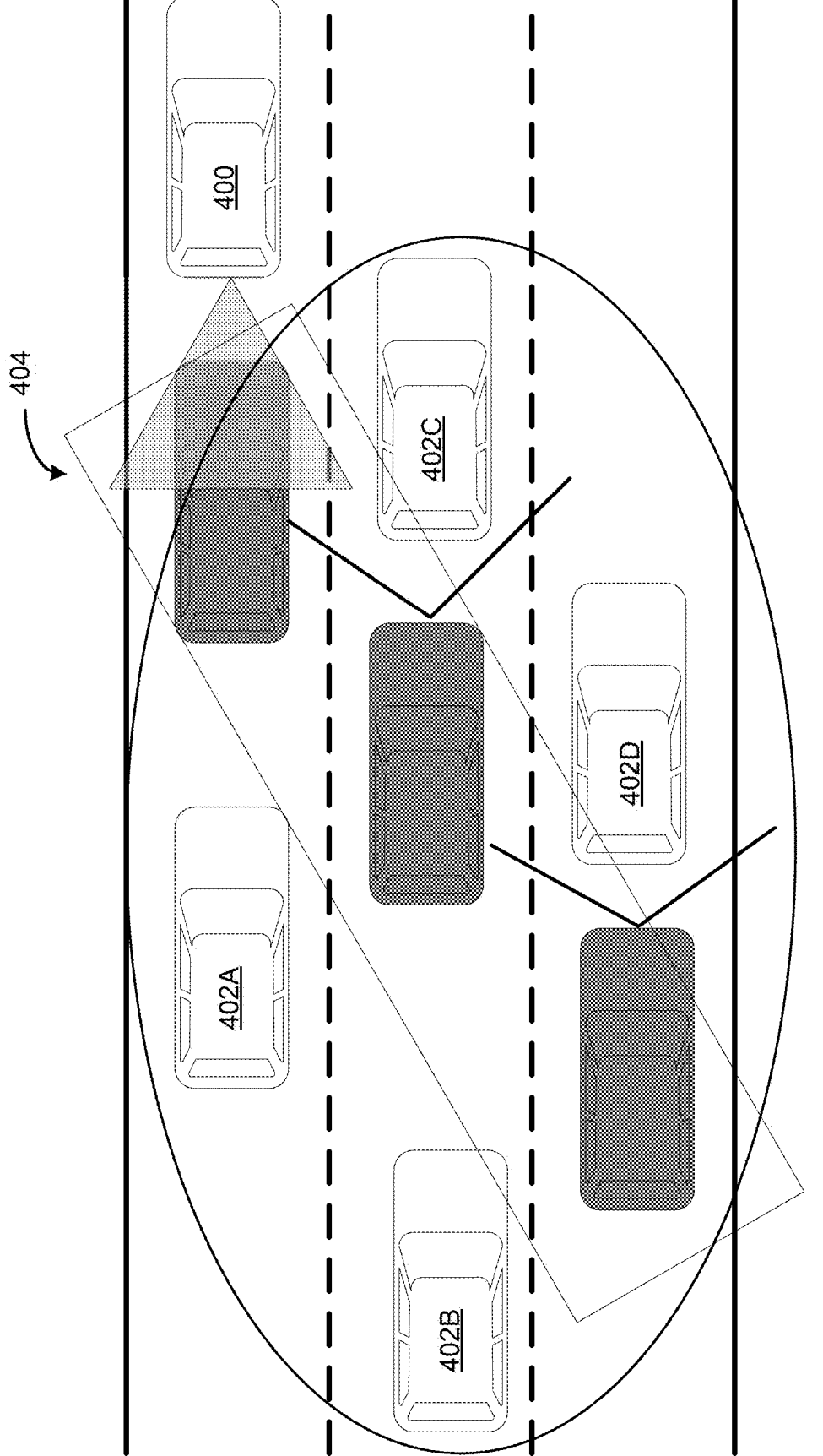
FIG. 4B illustrates another example environment incorporating approaching vehicle support in accordance with one embodiment.

FIGS. 4A and 4B illustrate example scenarios where VMC formation can assist in monitoring approaching vehicles. In FIG. 4A, ego vehicle 400 incorporates a RVAI system to monitor rear vehicles. This RVAI system looks for speed and time headway values of vehicles and alerts the driver with approaching vehicles. An approaching vehicle 404 may not trigger an RVAI system traditionally because the vehicle may appear at a "normal" distance/location from ego vehicle 400's point of view. Ego vehicle 400 can create a VMC comprising vehicles 402A-D. For example, using VMC formation circuit 210, ego vehicle 400 can form a mobile VMC to incorporate any surrounding vehicles within a certain distance. Ego vehicle 400 can form the VMC and treats the VMC as a remote RVAI system. As described above in FIG. 3, motion sensors or other sensors between multiple VMC members can track the trajectory of approaching vehicle 404. This trajectory can be sent to ego vehicle 400. Using VMC formation circuit 210, the ego vehicle can receive this trajectory and compare the trajectory to weaving patterns. VMC formation circuit 210 can then determine that this trajectory is similar to a weaving pattern. VMC formation circuit 210 (or in some embodiments, a remote server) can evaluate sensor data and compare the results to known patterns corresponding to the parameters. In such embodiments, the augmented sensor view of the VMC can enhance the ego vehicle's RVAI or AVS systems.

In such embodiments, the ego vehicle can solely determine the approaching vehicle and implement RVAI and/or AVS systems. The RVAI and AVS systems of an ego vehicle may generate notifications for the driver of the vehicle, alter an operating characteristic for a vehicle (e.g., in autonomous systems), or may transmit data about the approaching vehicle to a third party such as a remote server, authorities, or nearby vehicles. The VMC members can sense the time headway values of each other. As described above, ego vehicle 400 can lead the collaboration and guide vehicles 402A-D on which parameters to monitor, when to alert the RVAI system in the ego vehicle, and when to notify the ego vehicle driver. Through the VMC, ego vehicle 400 can detect approaching vehicle 404 from right to left or left to right based on vehicle 404's weaving.

In FIG. 4B, ego vehicle 400 incorporates an AVS system to track rear vehicles. In a traditional AVS system, if a rear vehicle stays behind the ego vehicle for more than a threshold time (tailgating), video can be recorded and shared with authorities, a data center, etc. Similar to FIG. 4A, a traditional AVS system may not alert the driver of the ego vehicle if an approaching vehicle appears "normal" from a single point of view. In FIG. 4B, ego vehicle 400 can form a VMC and treat the VMC as a remote AVS system. As with FIG. 4A, using VMC formation circuit 210, ego vehicle 400 can form a mobile VMC to incorporate any surrounding vehicles within a certain distance. As described above, motion sensors or other sensors between multiple VMC members can track the trajectory of approaching vehicle 404. This trajectory can be sent to ego vehicle 400. In such embodiments, the augmented sensor view of the VMC can enhance the ego vehicle's AVS system. Using this augmented sensor view, ego vehicle 400 can determine the approaching vehicle has nudging behavior and implement an AVS system. Nudging behavior can be detected across the VMC as the VMC members can track each other and look for multiple nudging along with tailgating behavior. The video of the approaching vehicle 404 can be recorded by VMC members 402A-D and shared with ego vehicle 400's AVS system.

Figure 5A:
FIG. 5A illustrates an example environment incorporating collaborative upload in accordance with one embodiment.
Figure 5B:
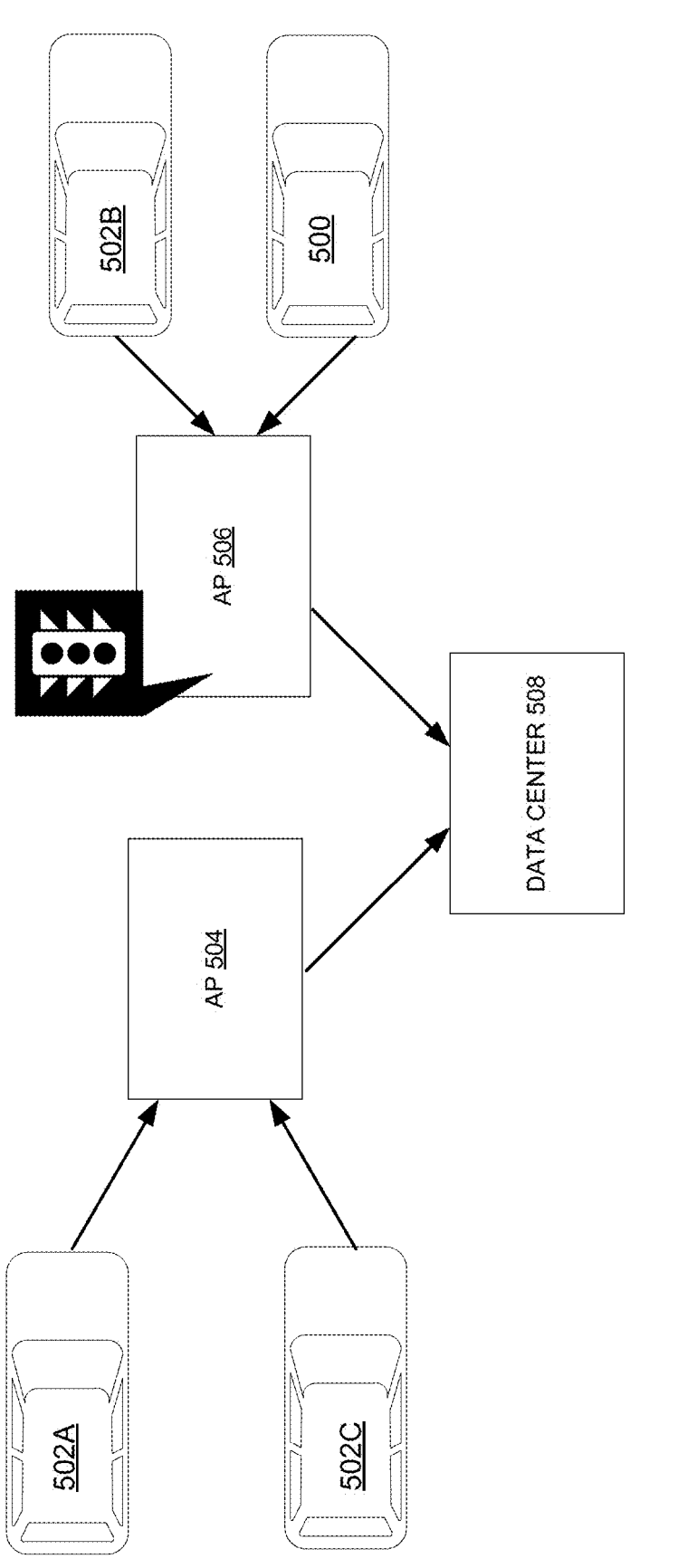
FIG. 5B illustrates an example system based on the example environment of FIG. 5A.

FIGS. 5A and 5B illustrate an example scenario for collaboratively uploading data using a VMC. FIG. 5A illustrates an example VMC formed from ego vehicle 500. Surrounding vehicles can include vehicles 502A-D. In the example of FIG. 5A, vehicles 502A-C joined the VMC. There are various reasons why vehicle 502D may not join the VMC. For example, as described above, the time a vehicle is connected to WiFi®/has WiFi® service could be a parameter in determining the formation of a VMC or in determining what subset of the VMC to use to upload data. In some embodiments, vehicle 502D may not traditionally charge for a long time, meaning that it is not connected to WiFi® for a long time. Vehicles 502A-C may be connected to WiFi® for longer periods of time and may be more desirable candidates for uploading the data.

FIG. 5B illustrates an example of how the VMC can execute a collaborative upload. As described above, VMC members may upload when they are connected to WiFi®, even after the VMC dissipates. In the example of FIG. 5B, vehicles 502A and 502C can upload to AP 504. AP 504 may be available when vehicles 502A and 502C are charging and are connected to WiFi®. In contrast, vehicles 500 and 502B may upload to AP 506, which may be associated with a traffic light. These vehicles may upload at the same time, at a different time, during the pendency of the VMC, and/or after the VMC has concluded. AP 504 and 506 can transmit the data to data center 508 after upload.

FIG. 6 illustrates an example method for generating a VMC for approaching vehicle support, in accordance with the embodiments described above. At block 602, the system can form a VMC in response to a subject vehicle activating an approaching vehicle response system. As described above, the subject vehicle can transmit a request and initiate the formation of the VMC. VMCs can be formed to observe subject vehicles from different perspectives. The subject vehicle can lead the collaboration and guide the vehicles on which parameters to monitor, when to alert the RVAI or AVS systems in the subject vehicle, and when to notify the subject vehicle driver. Various types of VMCs can be employed depending on the situation. Any VMC can be used to support the subject vehicle.

At block 604, the system can determine one or more monitoring parameters for one or more vehicles of the VMC. In some embodiments, these monitoring parameters may be predetermined. In other embodiments, monitoring parameters can be selected based on the situation. As described above, the system can tailor parameters to the situation based on sensor data. Sensor data from the VMC can indicate a particular situation or environments. The system may associate certain parameters with that environment and monitor those parameters based on the situation. If sensor data indicates a particular environment for the vehicle, then the system can determine appropriate parameters based on their connection to the relevant environment. As described above, the VMC may monitor these parameters via sensor data of the ego vehicle and/or VMC members. The system can evaluate sensor data and compare the results to known patterns corresponding to the parameters. The system can continuously update its findings and comparisons as situations change or reoccur. These parameters can be configured to detect an unsafe driving condition associated with the approaching vehicle. For example, the VMC may monitor weaving, excessive speeds and lane changes, tailgating, or any other conditions to determine an approaching vehicle. In some embodiments, the subject vehicle can determine these monitoring parameters. In other embodiments, multiple members of the VMC can determine one or more monitoring parameters. In accordance with the monitoring parameters, the VMC can track surrounding or nearby vehicles using sensor data to detect the approaching vehicle.

At block 606, the system can adjust the subject vehicle's approaching vehicle response system based on the one or more vehicles of the VMC executing the one or more monitoring parameters. In some embodiments, the sensor data collected throughout the VMC can be transmitted to the subject vehicle, so that the subject vehicle can make determinations about the approaching vehicle. As described above, certain levels of parameters or similarities in the parameters can be used to adjust the approaching vehicle response system. If one or more monitoring parameters satisfies a particular threshold or level associated with a likelihood of an approaching vehicle, the system can determine that there's an approaching vehicle. In some embodiments, the VMC can collaboratively share the sensor data and make a group determination about the approaching vehicle. In some embodiments, the augmented sensor view of the VMC can enhance the subject vehicle's RVAI or AVS systems. Determinations about approaching vehicles may change depending on the needs of the ego vehicle or members of the VMC. The VMC may shift perspective and may augment sensor data associated with different monitoring parameters depending on the situation. Updated guidance and notifications can be sent or displayed in the ego vehicle in accordance with the determinations of the VMC.

At block 608, the system can adjust an operating characteristic of the subject vehicle/ego vehicle based on the approaching vehicle. The RVAI and AVS systems may generate notifications for the driver of the vehicle, may alter an operating characteristic for a vehicle (e.g., in autonomous systems), or may transmit data about the approaching vehicle to a third party such as a remote server, authorities, or nearby vehicles.

Figure 7:
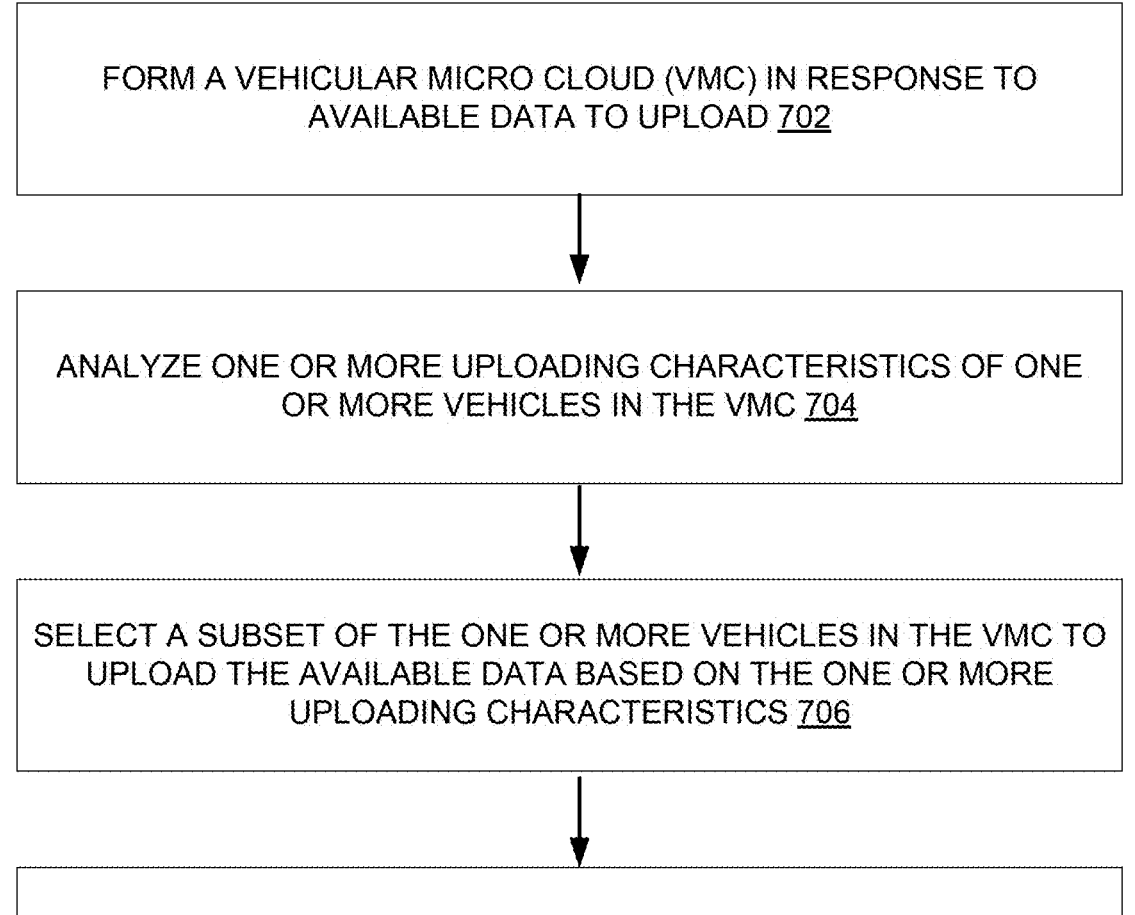
FIG. 7 illustrates an example method for collaborative upload using vehicular micro clouds in accordance with one embodiment.

FIG. 7 illustrates an example method for collaboratively uploading vehicle data in accordance with the embodiments described above. At block 702, the system can form a VMC in response to a determination that vehicle sensor data is available to upload. When an ego vehicle has vehicle data to upload, it can search for other nearby connected vehicles and initiate a VMC. In some embodiments, the ego vehicle can be guided to locations in accordance with the formation of a VMC. For example, the ego vehicle may be guided to locations with a high change in VMC formation. In some embodiments, the VMC may need to be formed to accommodate the data being uploaded. For example, vehicle data may require large data stores or underutilized computing units to pre-process the data prior to upload. The ego-vehicle can specify such requirements and the system can guide the ego vehicle to a VMC accordingly.

At block 704, the system can analyze one or more uploading characteristics of one or more vehicles in the VMC. The characteristics can be inferred based on a feedback loop to continuously improve selections of VMC candidates. These characteristics can inform the system of strong candidates with access, upload, or other data requirements. Parameters can include, but are not limited to processing power, storage, trajectory, and WiFi® connection throughout a planned trajectory, etc. At block 706, the VMC can select a subset of the one or more vehicles in the VMC to upload the vehicle sensor data based on the one or more uploading characteristics.

At block 708, the system can collaboratively upload the vehicle sensor data using the subset of the one or more vehicles. The ego vehicle can transfer vehicle data to the VMC members by applying pre-defined pre-processing steps (e.g., noise filtering). Alternatively, the ego vehicle can guide micro cloud members to apply defined pre-processing steps before uploading to the vehicle data. In some embodiments, when vehicles of the VMC are connected to WiFi®, they can upload their portion of the vehicle data. In some embodiments, this upload may occur after the VMC has been dismissed. While the VMC is operational, the VMC can determine the subset of vehicles, but members of the subset may upload data at various times depending on the associating parameters. A remote data center can receive uploaded data and monitor the performance of vehicle data collection and refine the system. A remote network can recommend improvements for the election of VMC members, pre-processing steps, etc. The remote network can transmit these recommendations to the ego vehicle and/or members of the VMC, so that when any member of the VMC initiates collaborative upload, the future generated VMC can be further refined.

Figure 8:
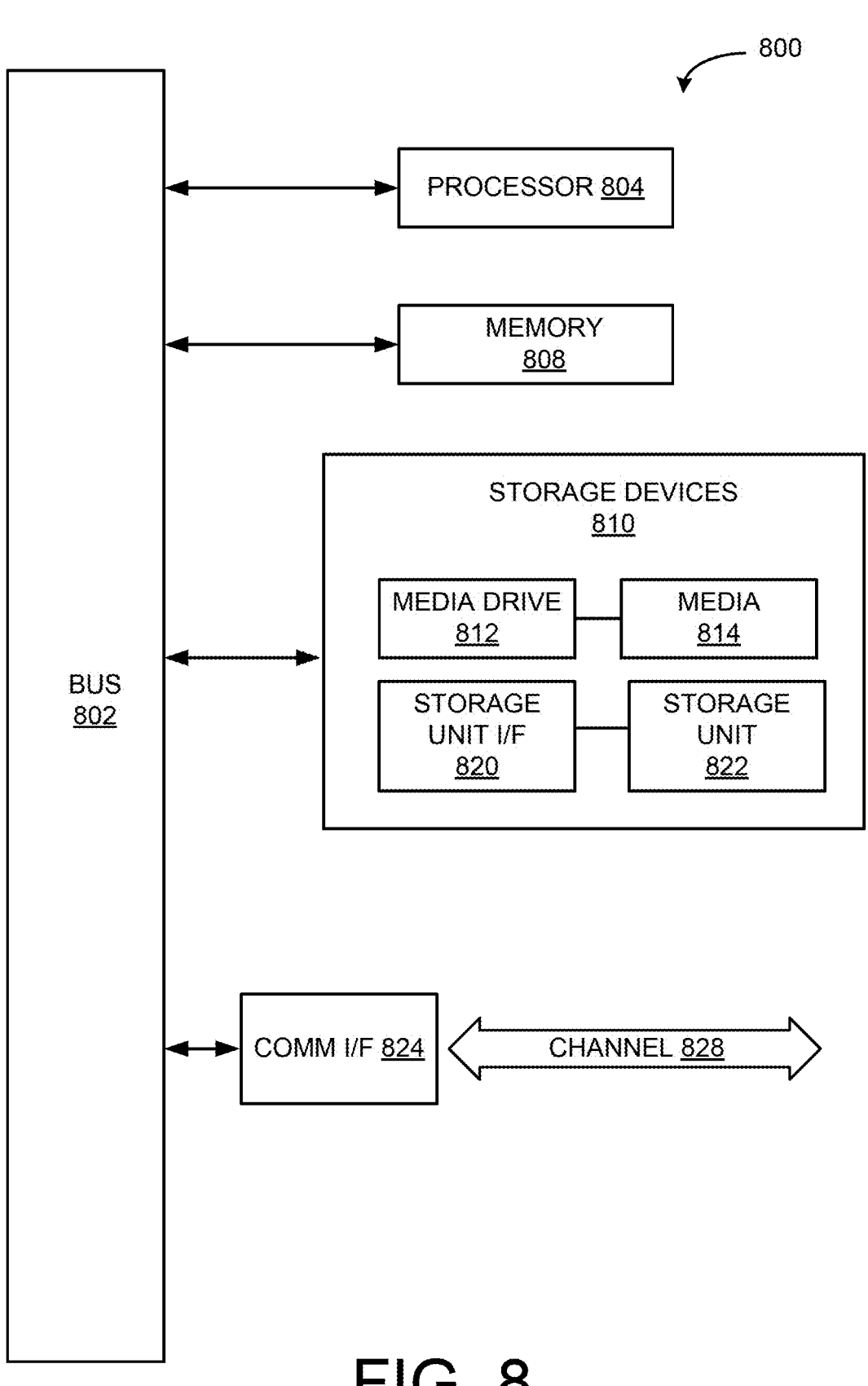
FIG. 8 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
forming a vehicular micro cloud (VMC) in response to a subject vehicle activating an approaching vehicle response system;
determining one or more monitoring parameters for one or more vehicles of the VMC;
adjusting operation of the subject vehicle's approaching vehicle response system by augmenting a sensor view of subject vehicle with sensor data received from at least one of the one or more vehicles of the VMC executing the one or more monitoring parameters; and
adjusting an operating characteristic of the subject vehicle based on an approaching vehicle.

2. The method of claim 1, wherein the one or more monitoring parameters are associated with detecting an unsafe driving condition associated with the approaching vehicle.

3. The method of claim 1, wherein the subject vehicle determines the one or more monitoring parameters for the one or more vehicles of the VMC.

4. The method of claim 1, further comprising generating an alert for the approaching vehicle response system based on detecting the approaching vehicle.

5. The method of claim 4, further comprising generating a notification for a driver of the subject vehicle based on detecting the approaching vehicle.

6. The method of claim 1, wherein the one or more vehicles of the VMC track surrounding vehicles using sensor data to detect the approaching vehicle.

7. The method of claim 6, further comprising transmitting the sensor data from the one or more vehicles of the VMC to the subject vehicle.

8. The method of claim 6, further comprising collaboratively uploading the sensor data with the one or more vehicles of the VMC.

9. A vehicle, comprising:

a processor; and a memory coupled to the processor to store instructions, which when executed by the processor, cause the processor to:

form a vehicular micro cloud (VMC) in response to an activated approaching vehicle response system;

determine one or more monitoring parameters for one or more vehicles of the VMC;

receive sensor data from the one or more vehicles of the VMC based on the one or more monitoring parameters;

adjust operation of the vehicle's approaching vehicle response system by augmenting a sensor view of vehicle with the received sensor data and the one or more monitoring parameters; and adjust an operating characteristic of the vehicle based on an approaching vehicle.

10. The vehicle of claim 9, wherein the one or more monitoring parameters are associated with detecting an unsafe driving condition associated with the approaching vehicle.

11. The vehicle of claim 9, wherein the instructions further cause the processor to generate an alert for the activated approaching vehicle response system based on detecting the approaching vehicle.

12. The vehicle of claim 11, wherein the instructions further cause the processor to generate a notification for a driver of the vehicle based on detecting the approaching vehicle.

13. The vehicle of claim 9, wherein the instructions further cause the processor to collaboratively upload the sensor data with the one or more vehicles of the VMC.

14. The vehicle of claim 13, wherein collaboratively uploading the sensor data comprises selecting a subset of the one or more vehicles of the VMC to upload the sensor data.

15. A non-transitory machine-readable medium having instructions stored therein, which when executed by a processor, cause the processor to:

form a vehicular micro cloud (VMC) in response to a subject vehicle activating an approaching vehicle response system;

determine one or more monitoring parameters for one or more vehicles of the VMC;

adjust operation of the subject vehicle's approaching vehicle response system by augmenting a sensor view of subject vehicle with sensor data received from at least one of the one or more vehicles of the VMC executing the one or more monitoring parameters; and adjust an operating characteristic of the subject vehicle based on an approaching vehicle; and collaboratively upload sensor data related to the approaching vehicle with the one or more vehicles of the VMC.

16. The non-transitory machine-readable medium of claim 15, wherein the one or more monitoring parameters are associated with detecting an unsafe driving condition associated with the approaching vehicle.

17. The non-transitory machine-readable medium of claim 15, wherein the instructions further cause the processor to generate an alert for the approaching vehicle response system based on detecting the approaching vehicle.

18. The non-transitory machine-readable medium of claim 17, wherein the instructions further cause the processor to generate a notification for a driver of the subject vehicle based on detecting the approaching vehicle.

19. The non-transitory machine-readable medium of claim 15, wherein the one or more vehicles of the VMC track surrounding vehicles using sensor data to detect the approaching vehicle.

20. The non-transitory machine-readable medium of claim 15, wherein the instructions further cause the processor to transmit the sensor data related to the approaching vehicle from the one or more vehicles of the VMC to the subject vehicle.

\* \* \* \* \*